(12) United States Patent
Zhang

(10) Patent No.: US 10,527,884 B2
(45) Date of Patent: Jan. 7, 2020

(54) DISPLAY DEVICE

(71) Applicant: BOE TECHNOLOGY GROUP CO., LTD., Beijing (CN)

(72) Inventor: Xiao Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/715,208

(22) Filed: Sep. 26, 2017

(65) Prior Publication Data

US 2018/0088411 A1 Mar. 29, 2018

(30) Foreign Application Priority Data

Sep. 29, 2016 (CN) .......................... 2016 1 0866279

(51) Int. Cl.
*G02F 1/1335* (2006.01)
*G02F 1/1333* (2006.01)
(Continued)

(52) U.S. Cl.
CPC .... *G02F 1/133553* (2013.01); *G02F 1/13439* (2013.01); *G02F 1/133377* (2013.01);
(Continued)

(58) Field of Classification Search
CPC .......... G02F 1/03; G02F 1/07; G02F 1/13306; G02F 1/133377; G02F 1/133553;
(Continued)

(56) References Cited

U.S. PATENT DOCUMENTS 7,034,987 B2 * 4/2006 Schlangen .............. G02F 1/167
204/606
8,553,315 B2 * 10/2013 Sato ..................... G09G 3/3446
345/107
(Continued)

FOREIGN PATENT DOCUMENTS

CN 1633623 A 6/2005
CN 1639625 A 7/2005
(Continued)

OTHER PUBLICATIONS

Chinese office action dated Jun. 25, 2018 for corresponding application No. 201610866279.0 with English translation attached.
(Continued)

*Primary Examiner* — Wen Huang
(74) *Attorney, Agent, or Firm* — Nath, Goldberg & Meyer; Joshua B. Goldberg

(57) ABSTRACT

The present disclosure belongs to the field of display technology, and particularly relates to a display device. The display device is divided into a plurality of pixel regions, in each of which a first electrode and a second electrode are provided oppositely, and an electrophoretic medium and charged particles are provided between the first electrode and the second electrode. A reflective medium layer is further provided in each pixel region, the reflective medium layer and the second electrode are provided on a same side of the electrophoretic medium and the charged particles. The second electrode is provided in only a part of the pixel region, and the reflective medium layer is provided at least in an area of the pixel region in which the second electrode is absent. The display device has high contrast by increasing brightness in white state display.

12 Claims, 2 Drawing Sheets

(51) Int. Cl.
*G02F 1/1343* (2006.01)
*G09G 3/34* (2006.01)
*G02F 1/167* (2019.01)
*G02B 26/02* (2006.01)
*G02F 1/1676* (2019.01)
*G02F 1/1681* (2019.01)

(52) U.S. Cl.
CPC ............. *G02F 1/167* (2013.01); *G09G 3/344* (2013.01); *G02B 26/02* (2013.01); *G02F 1/1676* (2019.01); *G02F 1/1681* (2019.01); *G02F 2201/34* (2013.01); *G02F 2203/02* (2013.01)

(58) Field of Classification Search
CPC ........... G02F 1/13439; G02F 1/136227; G02F 1/167; G02F 2002/1672; G02F 2002/1676; G02F 2002/1678; G02F 2201/123; G02F 2201/34; G02F 2201/44; G02F 2203/02; G02B 26/00; G02B 26/02; G09G 3/34; G09G 3/3433; G09G 3/344; G09G 3/3446; G09G 2310/06
USPC ............... 359/228, 252, 253, 296, 452, 453; 345/85, 107, 211
See application file for complete search history.

(56) References Cited

U.S. PATENT DOCUMENTS

| | | | |
|---|---|---|---|
| 8,810,894 B2* | 8/2014 | Hong | G02F 1/167 |
| | | | 359/296 |
| 8,976,162 B2* | 3/2015 | Sato | G02F 1/167 |
| | | | 345/107 |
| 9,684,482 B2* | 6/2017 | Zeng | G06F 3/1431 |
| 2007/0263291 A1 | 11/2007 | Whitehead | |
| 2013/0241816 A1* | 9/2013 | Tang | G02F 1/167 |
| | | | 345/107 |
| 2018/0031941 A1* | 2/2018 | Goulding | G02F 1/167 |
| 2018/0067373 A1* | 3/2018 | Kimura | G02F 1/167 |

FOREIGN PATENT DOCUMENTS

| | | |
|---|---|---|
| CN | 101160547 A | 4/2008 |
| CN | 101427179 A | 5/2009 |
| CN | 105579900 A | 5/2016 |
| WO | 2016130720 A1 | 8/2016 |

OTHER PUBLICATIONS

The Second Office Action dated Feb. 11, 2019 corresponding to Chinese application No. 201610866279.0.

* cited by examiner

DISPLAY DEVICE

CROSS-REFERENCE TO RELATED APPLICATION

This application claims priority to Chinese Patent Application No. 201610866279.0, filed on Sep. 29, 2016, the contents of which are incorporated by reference in the entirety.

TECHNICAL FIELD

The present disclosure relates to the field of display technology, and particularly relates to a display device

BACKGROUND

Electrophoretic display technology is a display technology of paper-like display devices that develops early, and in which a colored charged ball is moved in a liquid environment by applying an external electric field so as to show display effect with different colors. Electrophoretic (or E-Paper) display technology has been widely used as it combines advantages of both plain paper and electronic display.

However, an existing electrophoretic display device generally has a low contrast ratio. Therefore, how to improve the contrast ratio of an electrophoretic display device has become a technical problem to be solved urgently at present.

SUMMARY

The present disclosure provides a display device, which at least partially solves the problem of low contrast ratio of an existing electrophoretic display device.

According to an aspect of the present disclosure, there is provided a display device divided into a plurality of pixel regions, in each pixel region, a first electrode and a second electrode are provided oppositely, and an electrophoretic medium and charged particles are provided between the first electrode and the second electrode, wherein a reflective medium layer is further provided in each pixel region, the reflective medium layer and the second electrode are provided on a same side of the electrophoretic medium and the charged particles, the second electrode is provided in only part of the pixel region, and the reflective medium layer is provided at least in an area of the pixel region in which the second electrode is absent.

Optionally, the second electrode is a plurality of strip-like structures or a plurality of block structures, and a total area of the plurality of strip-like structures or block structures is smaller than an area of the pixel region.

Optionally, the second electrode and the reflective medium layer are provided in a same layer, and a sum of areas of the second electrode and the reflective medium layer is equal to an area of the pixel region.

Optionally, the reflective medium layer is provided on a side of the second electrode distal to the first electrode.

Optionally, an area of the reflective medium layer is equal to an area of the pixel region.

Optionally, the reflective medium layer is formed using a reflective material having a property of reflecting white light.

Further optionally, the reflective material comprises an organic material or a metal oxide material.

Still further optionally, the metal oxide material comprises titanium dioxide.

Optionally, the second electrode is formed using a reflective material having a property of reflecting white light.

Further optionally, the second electrode is formed using at least one of silver and aluminum.

Optionally, a plurality of microstructures that are continuously distributed are provided on a side of the first electrode facing the second electrode, and a refractive index of the microstructure is greater than a refractive index of the electrophoretic medium.

Optionally, the microstructure is a hemispherical structure or a prismatic structure, of which a protruding surface faces the second electrode.

Optionally, the first electrode is formed using a transparent conductive material.

Optionally, the transparent conductive material is at least one of indium gallium zinc oxide, indium zinc oxide, indium tin oxide, and indium gallium tin oxide.

Optionally, partition walls are provided between adjacent pixel regions, and for at least a part of the partition walls, a projection of the partition wall on the second electrode is within the second electrode.

Optionally, the partition wall is formed using a black material.

Optionally, the charged particles are black charged particles, and the black charged particles carry positive charges or negative charges.

The present disclosure has advantageous effects as follows: in a display device according to the present disclosure, a reflective medium layer and a reflective electrode are provided on a same side of an electrophoretic medium and charged particles, the reflective electrode is provided in only a part of the pixel region and the reflective medium layer is provided at least in an area of the pixel region in which the reflective electrode is absent, as such, brightness in white state display is increased, which in turn renders a display device with a high contrast ratio.

DETAILED DESCRIPTION OF THE EMBODIMENTS

To enable those skilled in the art to better understand technical solutions of the present disclosure, a display device provided in the present disclosure is described in detail below in conjunction with the accompanying drawings and specific implementations.

An embodiment of the present disclosure provides a display device based on electrophoretic display principle, and the display device has increased brightness in white state display and has increased contrast ratio.

Figure 2:
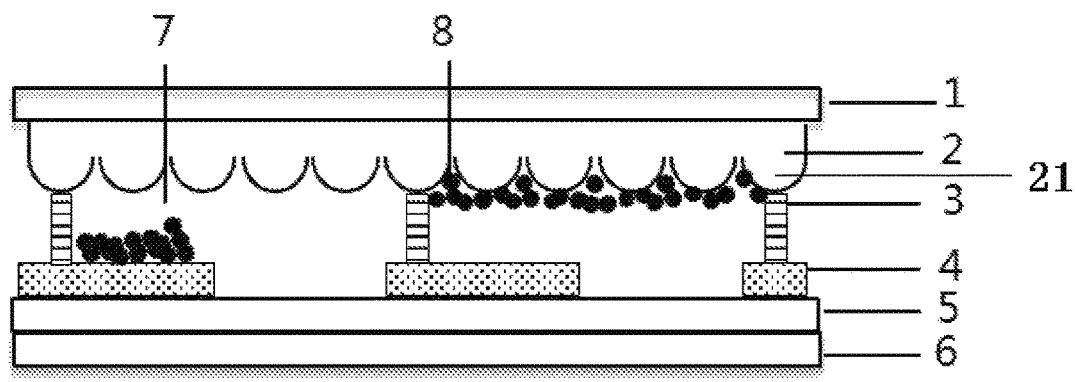
FIG. 2 is a schematic structural diagram of a display device according to an embodiment of the present disclosure.

FIG. 2 is a schematic structural diagram of a display device according to an embodiment of the present disclosure. As shown in FIG. 2, the display device according to the embodiment of the present disclosure is divided into a plurality of pixel regions, which are defined by partition walls 3. That is, each pixel region is a region enclosed by the partition walls. Between an upper substrate 1 and a lower substrate 6, a first electrode 2 and a second electrode 4 are provided oppositely in each pixel region, and an electrophoretic medium 7 and charged particles 8 are provided between the first electrode 2 and the second electrode 4. A reflective medium layer 5 is further provided in each pixel region, and the reflective medium layer 5 and the second electrode 4 are provided on a same side of the electrophoretic medium 7 and the charged particles 8. The second electrode 4 is provided in only a part of the pixel region, and the reflective medium layer 5 is provided at least in an area of the pixel region in which the second electrode 4 is absent.

In the present embodiment, the second electrode 4 is a reflective electrode, and the charged particles 8 are black charged particles.

Figure 3:
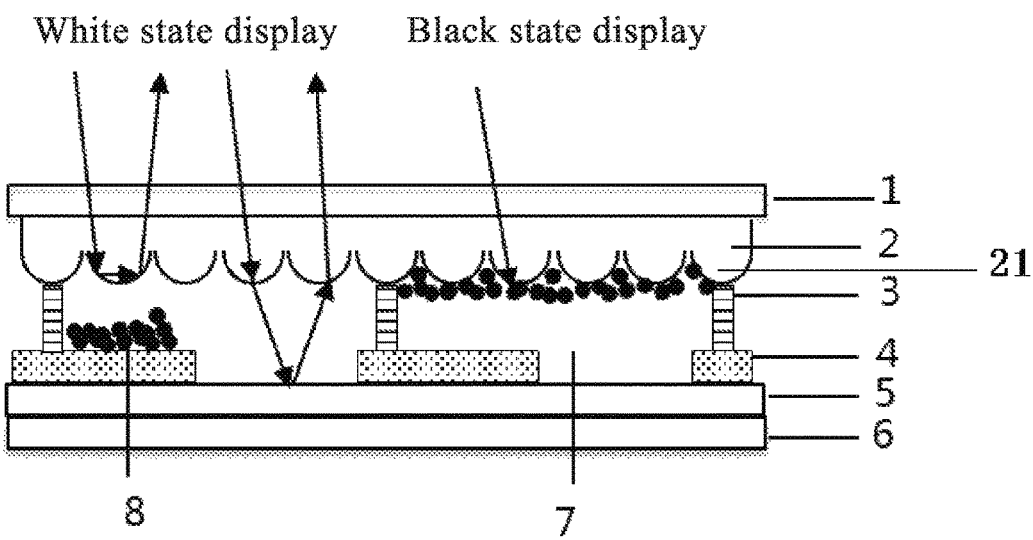
FIG. 3 is an optical path diagram in a display device according to an embodiment of the present disclosure.

The working principle of the display device according to the present embodiment will now be described with reference to FIG. 3.

In black state display, certain voltages are applied to the first electrode 2 and the second electrode 4 so that the black charged particles 8 move close to the first electrode 2 and take the place of the electrophoretic medium 7 to come into contact with the first electrode 2, therefore, a total reflection cannot occur between the electrophoretic medium 7 and the first electrode 2, and due to light absorption action of the black charged particles 8, corresponding pixels of the display device present dark state. In white state display, other voltages are applied to the first electrode 2 and the second electrode 4 so that the black charged particles 8 move close to the second electrode 4; since refractive indices of the first electrode 2 and the electrophoretic medium 7 are different, most of external light cannot be emitted into the display device but totally reflected, and corresponding pixels of the display device present white state; however, part of light is still emitted into the display device and returns back to the outside after being reflected by the second electrode 4 and the reflective medium layer 5, and thus luminous exitance is increased and the display device is rendered with increased brightness in white state display, which in turn increase the contrast ratio of the display device.

Figure 1:
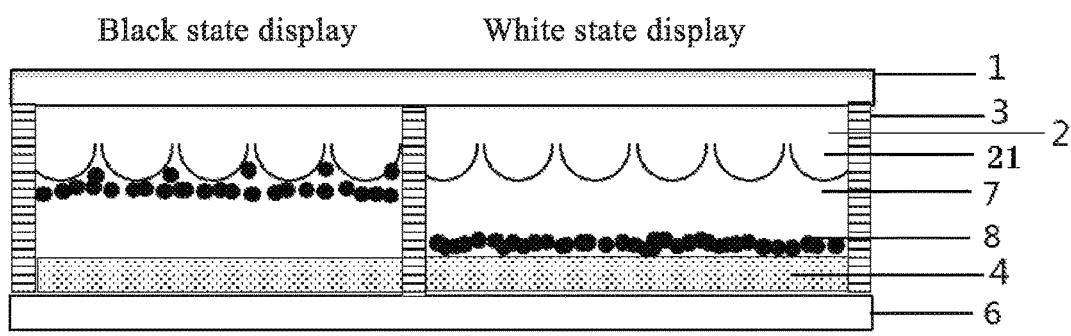
FIG. 1 is a schematic structural diagram of a display device in a comparative example.

In contrast, in the comparative example shown in FIG. 1, since the second electrode 4 is provided to cover the entire pixel region, the black charged particles 8 move close to the second electrode 4 and cover the entire second electrode 4 in white state display, and as a result, light that is not totally reflected but enters into the display device is completely absorbed by the black charged particles 8, resulting in low brightness in white state display and low contrast ratio.

Therefore, in the display device according to the present embodiment, brightness of the display device in white state display is increased by virtue of the reflection effect of the second electrode 4 and the reflective medium layer 5, thereby increasing the contrast ratio. In addition, since the second electrode 4 is provided in only a part of the pixel region, light entering into the display device in white state display will not be completely absorbed by the charged particles 8 and will be reflected out of the display device by the reflective medium layer 5.

Optionally, the second electrode 4 is formed to be a structure having a pattern. In some embodiments, the second electrode 4 is a plurality of strip-like structures or a plurality of block structures, and a total area of the plurality of strip-like structures or the plurality of block structures is smaller than an area of the pixel region, so as to ensure that at least part of the pixel region is not blocked when the charged particles 8 are attracted to the second electrode 4. With the structure of the second electrode 4, it can be ensured that the pixel region will not be completely blocked by the charged particles 8 to affect display effect of the display device in white state display.

In the display device according to the present embodiment, the reflective medium layer 5 is provided on a side of the second electrode 4 distal to the first electrode 2, that is, both the reflective electrode 4 and the reflective medium layer 5 are located on the lower substrate 6, and the reflective medium layer 5 is between the second electrode 4 and the lower substrate 6. In some embodiments, an area of the reflective medium layer 5 is equal to an area of the pixel region. In some embodiments, the reflective medium layer 5 is an integral structure that can be easily implemented in fabricating process. In this case, the reflective medium layer 5 extends substantially throughout the lower substrate 6. Due to cooperation of the second electrode 4 with the reflective medium layer 5, it is ensured that the charged particles 8 will not completely absorb light entering into the display device in white state display. Moreover, owing to the reflection effect by the second electrode 4 and the reflective medium layer 5, brightness of the display device in white state display is increased, and in turn the contrast of the display device is increased.

Optionally, the reflective medium layer 5 is formed using a reflective material having a property of reflecting white light, and the reflective material includes an organic material or a metal oxide material. By selecting the material of the reflective medium layer 5, better reflecting effect in white state display is ensured. Further optionally, the metal oxide material includes titanium dioxide ($TiO_2$). Titanium dioxide ($TiO_2$), as a typical reflective material, is easy to obtain and easy to prepare.

Optionally, the second electrode 4 is formed using a reflective material having a property of reflecting white light. In some embodiments, the second electrode 4 is formed using at least one of aluminum and silver. Aluminum or silver, as a common material employed in a semiconductor manufacturing process, is used as a material for forming the second electrode 4, and thus advantages of being easy to obtain and prepare can be achieved. Needless to say, the second electrode 4 may be formed using a reflective material other than aluminum and silver, which is not limited herein.

In order to better achieve reflective display, i.e., achieve electrophoretic display using external light, a plurality of microstructures 21 that are distributed continuously are provided on a side of the first electrode 2 facing the second electrode 4. To achieve total reflection between the microstructures 21 and the electrophoretic medium 7 in white state display (total reflection of light is an optical phenomenon that occurs when light is emitted into an optically thinner medium from an optically denser medium), a refractive index of the microstructure 21 is set to be greater than a refractive index of the electrophoretic medium 7. If the refractive index of the microstructure 21 is n1, and the refractive index of the electrophoretic medium 7 is n2, it should be satisfied that n1 is larger than n2. For example, n1 is in the range of 1.7 to 2.0, and n2 is in the range of 1.0 to 1.3. Due to the cooperation of the first electrode 2 and the microstructures 21, it is ensured that most of light entering from outside is reflected in white state display of the display device. Needless to say, due to the presence of the first electrode 2, effect of the total reflection may be affected to a certain extent. Thus, in some embodiments, a refractive index n of the first electrode 2 ranges from about 1.7 to about 2.0, is very close to n1, and thus does not substantially affect the effect of the total reflection.

Optionally, the microstructure 21 is a hemispherical structure or a prismatic structure, and a protruding surface of the hemispherical structure or the prismatic structure faces the second electrode 4. The process can be simplified by using the hemispherical structure or prismatic structure as the microstructure 21. Needless to say, the microstructure 21 is not limited to the above hemispherical structure or prismatic structure, and may be another microstructure satisfying the requirement of total reflection, and a material for forming the microstructure 21 is not particularly limited.

Optionally, the first electrode 2 is formed using a transparent conductive material. In some embodiments, the transparent conductive material is at least one of indium gallium zinc oxide, indium zinc oxide (IZO), indium tin oxide (ITO), and indium gallium tin oxide. The foregoing materials, as conventional materials employed in a semiconductor manufacturing process, are used as the material for forming the first electrode 2, and thus advantages of being ease to obtain and prepare can be achieved.

In the present embodiment, the display device is divided into a plurality of pixel regions by partition walls 3. It can be seen from FIG. 2 that, a partition wall 3 is provided between adjacent pixel regions, and for at least a part of the partition walls 3, a projection of the partition wall 3 on the second electrode 4 is within the second electrode 4. Optionally, the partition wall 3 is formed of a black material. The partition wall 3 and the second electrode 4 are provided to overlap with each other, so as to ensure that each pixel region has a large effective display area and a manufacturing process can be easily implemented. Needless to say, the partition wall 3 may be provided on the reflective medium layer 5 without overlapping with the second electrode 4, and position of the partition wall 3 is not limited herein.

In the display device according to the present embodiment, the charged particles 8 are black charged particles, which carry positive charges or negative charges. Here, only the black charged particles are required, and display based on principle of electrophoresis can be achieved by reflection, which can greatly simplify a structure of the display device.

In the display device in the present embodiment, theory basis for black state display is as follows: the black charged particles move close to the the microstructures 21 and the first electrode 2 provided thereabove under the action of an electric field, and take the place of the electrophoretic medium 7 to come into contact with the first electrode 2, so that total reflection effect is destroyed, and at the same time, corresponding pixels of the display device present black due to light absorption of the black charged particles.

Needless to say, although white state display of the display device in the present embodiment is based on the total reflection principle of light, part of incident light may not be totally reflected due to limitation of an incident angle, and enter into the electrophoretic medium 7. However, the part of incident light entering into the display device can be further reflected out of the display device by the second electrode 4 (i.e., the reflective electrode) and the reflective medium layer 5 therebelow, without being completely absorbed by the black charged particles.

In the display device based on the principle of reflective electrophoretic display in the present embodiment, a reflective medium layer and a reflective electrode are provided on a same side of the electrophoretic medium and the charged particles such that the reflective electrode is provided in only a part of the pixel region and the reflective medium layer is provided at least in an area in the pixel region where the reflective electrode is absent, thus, brightness in white state display is increased, and in turn the display device has relatively high contrast.

An embodiment of the present disclosure further provides a display device based on electrophoretic display principle, and the display device has increased brightness in white state display and further has increased contrast.

Figure 4:
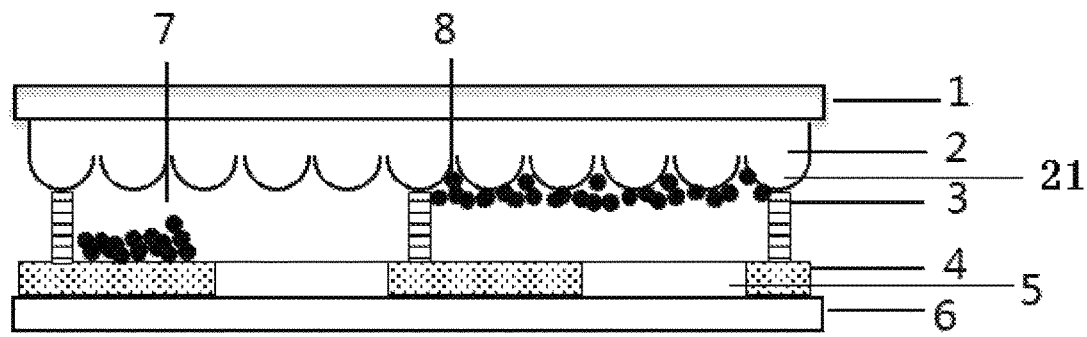
FIG. 4 is a schematic structural diagram of a display device according to an embodiment of the present disclosure.

Unlike the above embodiment, as shown in FIG. 4, in the present embodiment, the second electrode 4 and the reflective medium layer 5 are arranged in a same layer, and a sum of areas of the second electrode 4 and the reflective medium layer 5 is equal to an area of the pixel region. Under cooperation of the second electrode 4 and the reflective medium layer 5, not only is it ensured that the black charged particles 8 do not completely absorb light entering into the display device in white state display, and a good reflection effect is achieved, but also utilization of space inside the display device is optimized.

Other structures of the display device in this embodiment are the same as those of the display device in the above embodiment, may be formed using same materials, and are not be described in detail here.

Working principle of the display device in the present embodiment is the same as that of the display device in the above embodiment, and is not described in detail here.

In the display device in the present embodiment, by providing the reflective medium layer and the reflective electrode at a same side of the electrophoretic medium and the charged particles and in a same layer throughout the entire pixel region, brightness in white state display is increased, and in turn the display device has relatively high contrast.

It could be understood that the above implementations are merely exemplary implementations adopted for explaining the principle of the present disclosure, but the present disclosure is not limited thereto. For those skilled in the art, various modifications and improvements can be made without departing from the spirit and essence of the present disclosure, and these modifications and improvements are also considered to be within the protection scope of the present disclosure.

The invention claimed is:

1. A display device, divided into a plurality of pixel regions, in each of which a first electrode and a second electrode are provided oppositely, and an electrophoretic medium and charged particles are provided between the first electrode and the second electrode, wherein a reflective medium layer is further provided in each pixel region, the reflective medium layer and the second electrode are provided on a same side of the electrophoretic medium and the charged particles, the second electrode is provided in only a part of each pixel region, and the reflective medium layer is provided at least in an area of the pixel region in which the second electrode is absent, wherein the reflective medium layer is formed of titanium dioxide, a plurality of microstructures that are continuously distributed are provided on a side of the first electrode facing the second electrode, a refractive index of the microstructures is greater than a refractive index of the electrophoretic medium, and a refractive index range of the microstructures is the same as a refractive index range of the first electrode.

2. The display device according to claim 1, wherein the second electrode is a plurality of strip-like structures or a plurality of block structures, and a total area of the plurality of strip-like structures or the plurality of block structures is smaller than an area of one pixel region.

3. The display device according to claim 1, wherein the second electrode and the reflective medium layer are provided in a same layer, and a sum of areas of the second electrode and the reflective medium layer is equal to the area of the pixel region.

4. The display device according to claim 1, wherein the reflective medium layer is provided on a side of the second electrode distal to the first electrode.

5. The display device according to claim 1, wherein the second electrode is formed using a reflective material having a property of reflecting white light.

6. The display device according to claim 5, wherein, the second electrode is formed using at least one of silver and aluminum.

7. The display device according to claim 1, wherein the microstructures are hemispherical structures or prismatic structures, of which a protruding surface faces the second electrode.

8. The display device according to claim 1, wherein the first electrode is formed using a transparent conductive material.

9. The display device according to claim 8, wherein the transparent conductive material is at least one of indium gallium zinc oxide, indium zinc oxide, indium tin oxide, and indium gallium tin oxide.

10. The display device according to claim 1, wherein partition walls are provided between adjacent pixel regions, and a projection of each of at least part of the partition walls on the second electrode is within the second electrode.

11. The display device according to claim 10, wherein the partition walls are formed using a black material.

12. The display device according to claim 1, wherein the charged particles are black charged particles, and the black charged particles carry positive charges or negative charges.

* * * * *